(12) United States Patent
Boerhout

(10) Patent No.: US 10,748,406 B2
(45) Date of Patent: Aug. 18, 2020

(54) MACHINE CONDITION MEASUREMENT SYSTEM WITH HAPTIC FEEDBACK

(71) Applicant: Aktiebolaget SKF, Gothenburg (SE)

(72) Inventor: Johannes I. Boerhout, San Diego, CA (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/790,407

(22) Filed: Jul. 2, 2015

(65) Prior Publication Data

US 2017/0004697 A1    Jan. 5, 2017

(51) Int. Cl.
| | | |
|---|---|---|
| *G06F 17/00* | (2019.01) |
| *G08B 21/18* | (2006.01) |
| *G06F 1/16* | (2006.01) |
| *G06F 3/01* | (2006.01) |
| *G08B 6/00* | (2006.01) |

(52) U.S. Cl.
CPC ............. *G08B 21/18* (2013.01); *G06F 1/163* (2013.01); *G06F 3/016* (2013.01); *G08B 6/00* (2013.01)

(58) Field of Classification Search
CPC .. G05B 19/416; G05B 19/41825; G01H 1/04; G16H 40/67; G16H 50/20; G16H 20/60; G06Q 50/22; G08B 21/18; G08B 6/00; G06F 1/163; G06F 3/016; A61B 5/0205; A61B 5/0022; A61B 5/746
See application file for complete search history.

(56) References Cited

U.S. PATENT DOCUMENTS

| | | | | |
|---|---|---|---|---|
| 4,817,003 A | * | 3/1989 | Nagase ................. | B24B 41/042 700/164 |
| 4,916,439 A | * | 4/1990 | Estes ...................... | G08B 1/08 340/539.1 |
| 5,943,634 A | * | 8/1999 | Piety ..................... | B23Q 17/12 700/280 |
| 5,992,237 A | * | 11/1999 | McCarty ................ | F16C 19/52 702/56 |
| 6,122,565 A | * | 9/2000 | Wenning ............... | B23Q 17/00 700/206 |
| 6,202,491 B1 | * | 3/2001 | McCarty ............... | G01D 9/005 702/56 |
| 6,298,308 B1 | * | 10/2001 | Reid ..................... | G01H 1/003 702/188 |
| 6,489,884 B1 | * | 12/2002 | Lamberson ........... | G01H 1/003 340/3.1 |

(Continued)

*Primary Examiner* — Hai Phan
*Assistant Examiner* — Son M Tang
(74) *Attorney, Agent, or Firm* — Garcia-Zamor Intellectual Property Law; Ruy Garcia-Zamor; Bryan Peckjian

(57) ABSTRACT

A machine condition monitoring system employing a haptic feedback device. The haptic feedback device can be employed to notify an operator of an acquisition of a machine parameter measurement. The haptic feedback device can be integrated into a control unit of a condition monitoring device and/or a remote condition monitoring status receiving device. The haptic feedback device containing notification apparatus can be worn by the operator, thus providing immediate notification without requiring the Operator's undivided attention. The notification apparatus can be worn on the operator's waist, wrist, upper arm, ankle, neck, etc. The notification apparatus can also be stored within a pocket of a garment worn by the operator.

20 Claims, 8 Drawing Sheets

(56) References Cited

U.S. PATENT DOCUMENTS

| | | | | |
|---|---|---|---|---|
| 6,513,386 | B2* | 2/2003 | Barclay | G01M 13/045 |
| | | | | 73/649 |
| 8,643,539 | B2* | 2/2014 | Pauly | G01R 29/0871 |
| | | | | 324/500 |
| 8,707,193 | B2* | 4/2014 | Khazanov | G05B 23/0264 |
| | | | | 715/764 |
| 9,159,217 | B1* | 10/2015 | Logan | G05B 19/042 |
| 9,759,636 | B2* | 9/2017 | Murphy | G01M 99/005 |
| 10,095,659 | B2* | 10/2018 | Katz | G01R 1/04 |
| 2002/0070848 | A1* | 6/2002 | Adler | D06F 39/005 |
| | | | | 340/311.2 |
| 2004/0197040 | A1* | 10/2004 | Walker | F16C 19/52 |
| | | | | 384/462 |
| 2005/0051213 | A1* | 3/2005 | Clemens | A47L 15/421 |
| | | | | 137/392 |
| 2005/0116824 | A1* | 6/2005 | Su | G08B 21/187 |
| | | | | 340/539.26 |
| 2005/0118703 | A1* | 6/2005 | Su | C12M 41/48 |
| | | | | 435/286.1 |
| 2014/0027944 | A1 | 1/2014 | Nealey et al. | |
| 2014/0222378 | A1* | 8/2014 | Piety | G05B 23/02 |
| | | | | 702/183 |
| 2014/0257722 | A1* | 9/2014 | Wilson | H02K 11/25 |
| | | | | 702/58 |
| 2014/0279443 | A1* | 9/2014 | Neeley | G01D 7/08 |
| | | | | 705/39 |
| 2015/0310723 | A1* | 10/2015 | Pinkerton | G08B 21/182 |
| | | | | 340/870.09 |

* cited by examiner

MACHINE CONDITION MEASUREMENT SYSTEM WITH HAPTIC FEEDBACK

FIELD OF THE INVENTION

The present invention relates to a machine condition data acquisition system including a condition monitoring device in communication with at least one remote notification device. More specifically, the system is adapted to forward a message from the condition monitoring device to each remote notification device, wherein the remote notification device then notifies the user that machine parameter measurements have been acquired; the notification process employing at a haptic notification device.

DISCUSSION OF THE RELATED ART

Rotating machinery, equipment, or other devices can be provided in many form factors, such as an electrical motor, a combustion motor, a pump, a transmission or other gear box, and the like. Machine equipment uptime is critical in optimizing output and maintaining operation of the machine. Machines may be installed in critical systems requiring continuous uptime, with planned downtime for maintenance. Unscheduled downtime can impact productivity of the machine and in more critical installations, could impact safety of individuals, property, and the like that rely upon the continuous operation of the machine.

One of the most important methods of determining the current health of any machine is by monitoring any of a variety of operating conditions (such as temperature, vibration, etc.). The operating conditions would be automatically checked at periodic intervals by a condition monitoring device. The acquired data is stored either in a digital data storage device resident with the condition monitoring device (CMD) or transmitted for storage in a remotely located digital data storage device, such as a data storage server.

The condition monitoring device (CMD) is provided as a portable, handheld device, which would be temporarily attached to a machine for use or as a permanently installed device, which would be permanently attached to the machine. The condition monitoring device (CMD) can be provided in a variety of configurations. For example, one configuration employs a probe or sensor with an integrated display. A second configuration employs a probe or sensor with separate hand held display and/or collection unit.

The condition monitoring devices (CMD) can be used to determine a state of one or more specific machine parameters, such as a degree of vibration, a status of lubrication, a temperature level, and the like. When a specific measured condition is determined, the operator of the device may be asked to perform a corrective action. The workflow for the operator involves measuring one or more machine parameters, then looking at the display unit to determine if an action needs to be taken, and if so, which action. The current system mandates that an operator remain available and attentive to monitor the results of each measurement of the one or more machine parameters.

Thus, what is desired is a system and associated method of use which notifies one or more service persons of a measurement of one or more machine parameters, wherein the machine parameters establish a machine's current condition, including measurements where the at least one machine parameter measurement is outside of a range considered to be an alarm condition.

SUMMARY OF THE INVENTION

The present invention is directed to a system and an associated method of notifying an operator of a measurement of one or more machine parameters, including measurements where the at least one machine parameter measurement is outside of a range considered to be an alarm condition. More specifically, the notification to the operator is accomplished without requiring the operator to continuously monitor a displayed output presenting the acquired measurements of one or more machine parameters.

The primary purpose of this invention is to allow an operator of a condition monitoring measurement device to acquire readings and:
  a) know that a reading has been taken (i.e. is finished) without having to look at the device or some display;
  b) know that a reading needs to be re-taken (e.g., due to some detected condition) without having to remove the measurement sensor from the location nor having to look at some display to determine that the measurement needs to be re-taken;
  c) know that additional/specific actions need to be taken after measuring a point at a specific location, without having to look at a display to make this determination; and
  d) be alerted to a plant wide condition or specific message from a control room function without having to look at a display nor to receive an audible message.

Corrective action conditions can be presented to the operator by a haptic feedback mechanism which can be worn under protective garments and not be visually displayed. Instead of glancing at the measurement's display unit, the operator feels the haptic feedback and can react accordingly in a timely manner. Secondly, the feedback mechanism may also be in communication with a plant wide notification system which would not require operators to visually observe the set of indicators. Haptic feedback is a tactile feedback technology that generates a sense of touch by applying forces, vibrations, or motions to the user.

A system embodiment of a machine condition monitoring system, in accordance with the present invention, includes:
  a condition monitoring device adapted for attachment to a machine;
  a haptic device in operational communication with the condition monitoring device,
  wherein the haptic device generates a haptic feedback upon acquisition of a machine parameters measurement including when the at least one machine parameter measurement is outside of a range considered to be an alarm condition.

In a second aspect, the condition monitoring device is permanently attached to the machine.

In another aspect, the condition monitoring device employs a probe or sensor with an integrated display, wherein the condition monitoring device is permanently attached to the machine.

In yet another aspect, the condition monitoring device is a portable device that is temporarily attached to the machine.

In yet another aspect, the condition monitoring device is a portable device that is temporarily attached to the machine using one of a stud, a threaded stud, a quick connect mounting stud, a stinger (a support tube), and a magnetic mount.

In yet another aspect, the condition monitoring device includes a probe or sensor integral with a hand held data collection unit, wherein the condition monitoring device is temporarily attached to the machine.

In yet another aspect, the condition monitoring device is a portable device that includes a hand held data collection unit and a separate sensor, wherein the sensor is temporarily attached to the machine.

In yet another aspect, the haptic feedback device is integrated within the condition monitoring device.

In yet another aspect, the haptic feedback device is integrated within a remote condition monitoring data receiving device.

In yet another aspect, the remote condition monitoring data receiving device comprising the haptic feedback device is one of a Smartphone, a Smartwatch, a portable computing device, a portable computing tablet, a custom device, and the like, wherein the remote condition monitoring data receiving device is adapted to communicate with the condition monitoring device. The system can employ an application operating on an existing portable computing device.

In yet another aspect, the remote condition monitoring data receiving device comprising the haptic feedback device is adapted to be worn by an operator.

In yet another aspect, the remote condition monitoring data receiving device comprising the haptic feedback device is adapted to be worn by an operator in a location that is commonly concealed by clothing. This can include a wrist, a necklace, a waistline, an ankle, an upper arm and the like.

In yet another aspect, the remote condition monitoring data receiving device comprising the haptic feedback device is provided in a format of a watch.

In yet another aspect, the remote condition monitoring data receiving device comprising the haptic feedback device is adapted to be carried by a belt.

In yet another aspect, the remote condition monitoring data receiving device comprising the haptic feedback device is adapted to be carried by a belt, wherein the belt is of a length suited for placement around an operator's waistline.

In yet another aspect, the remote condition monitoring data receiving device comprising the haptic feedback device is adapted to be carried by a strap, wherein the strap is of a length suited for placement around an operator's upper arm.

In yet another aspect, the remote condition monitoring data receiving device comprising the haptic feedback device can be placed within a pocket of a garment worn by the operator.

In yet another aspect, the remote condition monitoring data receiving device comprising the haptic feedback device is placed within a carrying case, wherein the carrying case is adapted to be carried by one of a belt and a strap.

In yet another aspect, the remote condition monitoring data receiving device further comprises a secondary notification device, wherein the secondary notification is at least one of a light emitting device and an audible emitting device.

In yet another aspect, the haptic feedback device is one of an off-balanced motor, a pancake motor (as taught by U.S. Pat. No. 4,864,276), a linear vibration producing device, an electromagnetic resonant vibrator (as taught by U.S. Pat. No. 5,107,540), a piezo-electric resonant vibrator, and the like.

In yet another aspect, the haptic feedback device can include a secondary function of an audible alert, for example, buzzer.

A method embodiment of the machine condition monitoring system, in accordance with the present invention, includes steps of:
measuring at least one machine parameters using a condition monitoring device;
providing a signal from the condition monitoring device to activate a haptic feedback device; and
activating the haptic feedback device to generate a haptic feedback.

In a second aspect, the process further comprises a step of attaching one of a hand held condition monitoring device and a probe in operational communication with a portable condition monitoring controller unit to a machine.

In another aspect, the step of measuring a one or more parameters, which would be representative of a machine condition using a condition monitoring device monitor to measure at least one of the following parameters:
Vibration;
Temperature;
Velocity;
Acceleration;
Acoustics;
Lubrication; and
Process Data.

In yet another aspect, wherein the step of providing a signal from the condition monitoring device to activate a haptic feedback device is accomplished proximate a time of completion of the step of measuring the at least one machine parameter using the condition monitoring device.

In yet another aspect, the process further comprises a step of activating a haptic feedback device upon acquisition of any machine parameter measurement.

In yet another aspect, the process further comprises steps of:
comparing acquired machine parameter data for each machine parameter with an acceptable range for the associated machine parameter;
providing a signal from the condition monitoring device to activate a haptic feedback device only under a condition where the acquired machine parameter measurement for at least one machine parameter is outside of an acceptable range for the associated machine parameter.

In yet another aspect, the process further comprises steps of:
comparing acquired machine parameter data for each machine condition with an acceptable range for the associated machine parameter;
providing a message to a remote condition monitoring data receiving device, wherein the message includes a status of the acquired machine parameter measurement for at least one machine parameter relative to an acceptable range for the associated machine parameter.

In yet another aspect, the process further comprises a step of activating a haptic feedback device only under a condition where the acquired machine parameter measurement for at least one machine parameter is outside of an acceptable range for the associated machine parameter.

In yet another aspect, wherein the step of providing a message to a remote condition monitoring data receiving device is only completed when the acquired machine parameter measurement for at least one machine parameter is outside of an acceptable range for the associated machine parameter.

In yet another aspect, the process further comprises a step of securing the remote condition monitoring data receiving device to an operator's body. The remote condition monitoring data receiving device can be temporarily worn on an operator's waistline, wrist, upper arm, ankle, around an operator's neck, and the like.

In yet another aspect, the remote condition monitoring data receiving device is a remotely located computer.

In yet another aspect, the remote condition monitoring data receiving device is a remotely located server, wherein the remotely located server is accessible by at least one other computer in a computer network. The computer network is preferably a secured network.

In yet another aspect, the remote condition monitoring data receiving device is a remotely located computer within a computer network.

In yet another aspect, the process further comprises a step of securing the remote condition monitoring data receiving device can be placed in a pocket of an article of clothing worn by an operator. This can include a shirt pocket, a pant pocket, a skirt pocket, a jacket pocket, and the like.

In yet another aspect, the process further comprises a step of embedding the remote condition monitoring data receiving device within protective gear worn by the operator. Examples of protective gear include: a hard hat or helmet, glasses, gloves, elbow pads, knee pads, ear protectors, and the like. The remote condition monitoring data receiving device can be integrated within the protective gear, temporarily attached to the protective gear by a coupling system, placed within a pocket integral with the protective gear, and the like.

In yet another aspect, the process employs the haptic feedback to aid in the attachment of the hand held condition monitoring device onto the machine, by utilizing vibrational energy to dislodge unwanted contaminants from between the hand held condition monitoring device and the machine. The process would include a step of activating the haptic feedback device during the step of installing the hand held condition monitoring device onto the machine.

In yet another aspect, the communication link can be provided using at least one of wired communications, Bluetooth wireless communications, Wi-Fi wireless communications, Zigbee wireless communications, cellular wireless communications, and the like.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

Figure 1:
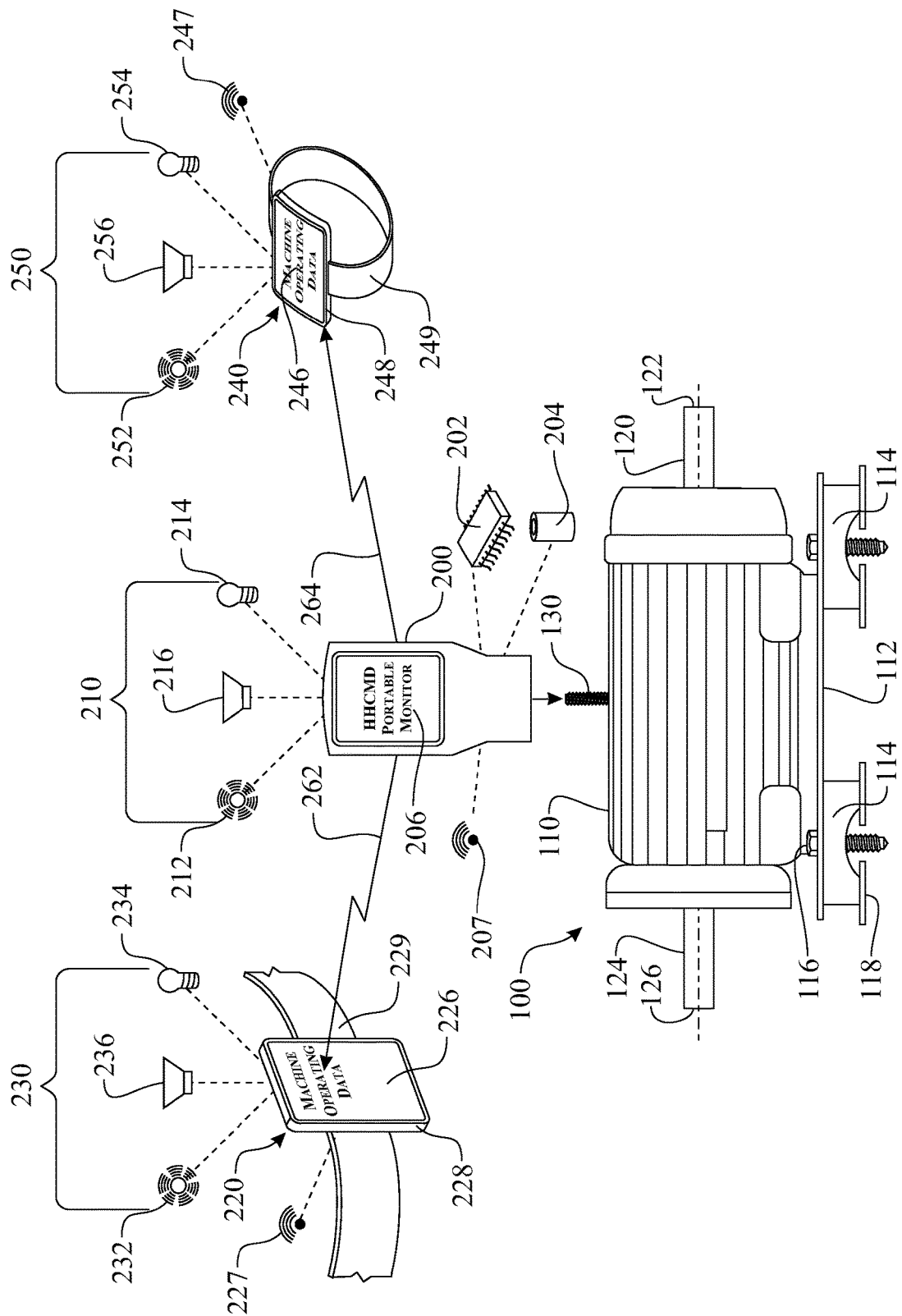
FIG. 1 presents a schematic diagram depicting an exemplary machine condition monitoring system providing haptic feedback, wherein the machine condition monitoring system employs a hand held condition monitoring device (HHCMD)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Machinery commonly includes moving parts. The parts can move in a rotational direction, a linear direction, or have any other suitable motion. Operation of the machinery over time can cause wear. Timely maintenance and service can minimize any impact of wear on the operation of the machine. Rotating machinery, equipment, or other devices can be provided in many form factors, such as an electrical motor, a combustion motor, a pump, a transmission or other gear box, a drive shaft, and the like. Linear machinery includes slide bearings, shock absorbers, hydraulic rams, linear guide tracks, and the like. The following are examples of the impact of premature failure resulting from untimely service on the machine:

- Increased frequency of replacing parts, such as bearings, couplings, seals, and the like, which result in additional operational costs including replacement parts and labor;
- Increased logistic costs, including materials procurement, inventory holding costs, materials management costs, and the like;
- Increased frequency of interventions, including man hours, materials, tools, transportation, and the like, and thus adding associated intervention costs to the overall operating budget; and
- where applicable, impacts from resultant downtime of the machinery, including reduction in productivity, reduced labor efficiencies (revenue per labor cost), reduced real estate efficiency (revenue per area of real estate), lost revenue, and the like.

Machines are monitored using condition monitoring devices (CMD's). The condition monitoring devices (CMD's) periodically acquire machine parameter measurements. The acquired machine parameter measurements are forwarded for review by an operator. The operator uses the acquired machine parameter measurements to determine if one or more services to the machine are required. The current process requires that the operator continuously monitor the machine parameter measurements.

Figure 4:
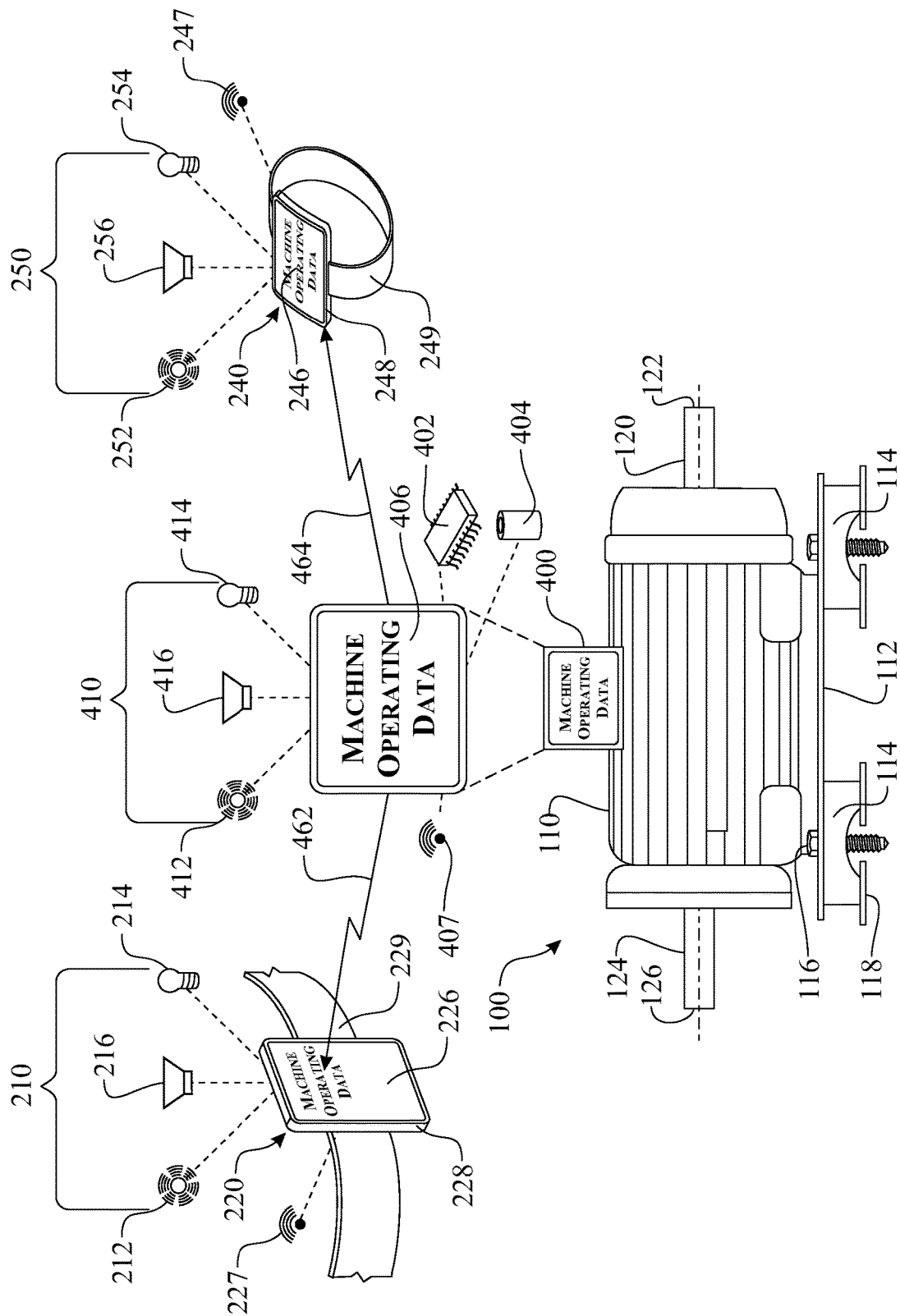
FIG. 4 presents a schematic diagram depicting an exemplary machine condition monitoring system providing haptic feedback, wherein the machine condition monitoring system employs a hand held condition monitoring device (HHCMD)
Figure 5:
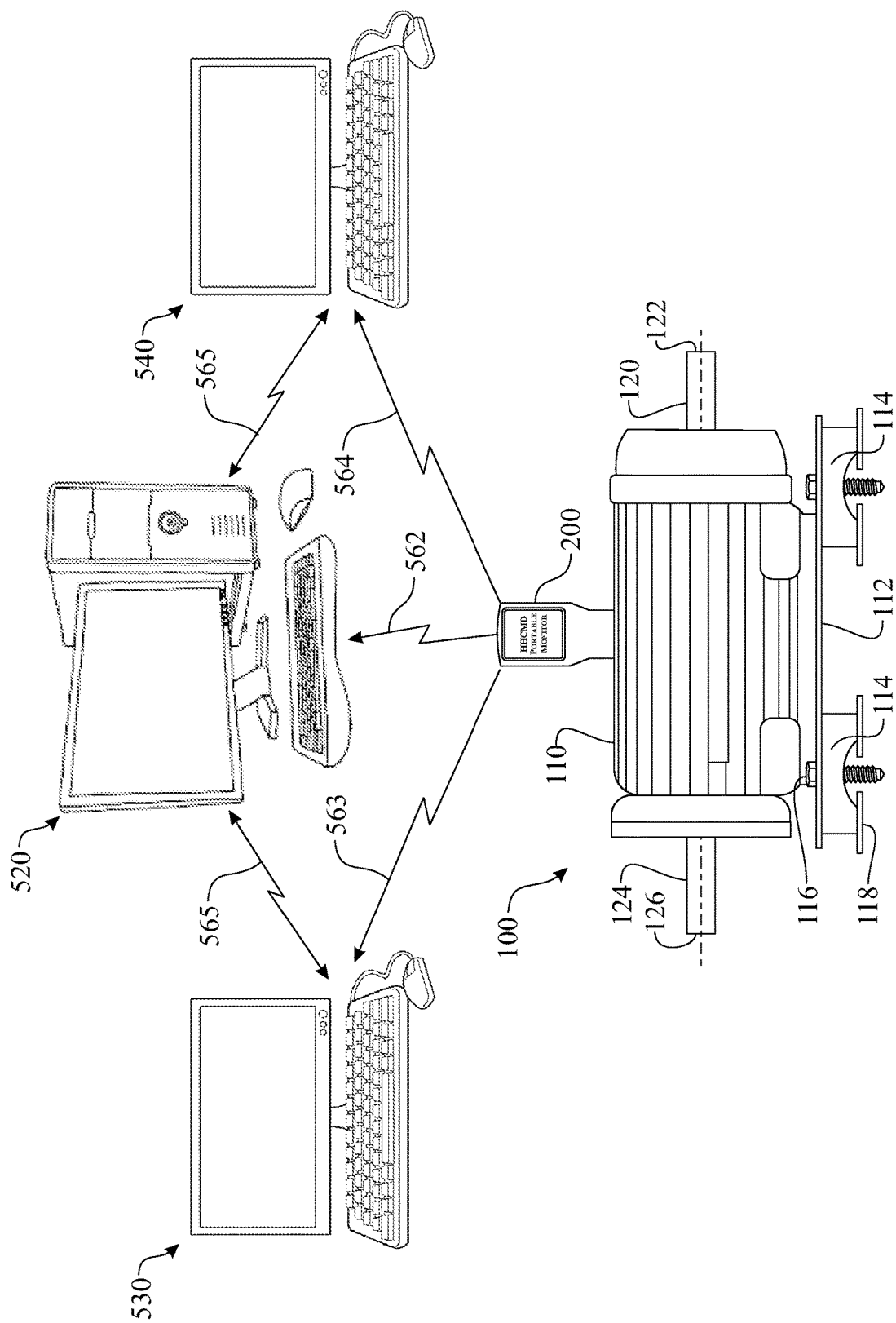
FIG. 5 presents a schematic diagram depicting an exemplary machine condition monitoring system in communication with an exemplary computer network.

The present invention integrates a haptic feedback device 212, 232, 252, 312, into a machine condition monitoring system, as illustrated in FIGS. 1, 4, and 5. In a first exemplary implementation, the haptic feedback device can be integrated into a hand held condition monitoring device (HHCMD) 200, as illustrated in FIG. 1.

The hand held condition monitoring device (HHCMD) 200 is employed to monitor one or more machine parameter metrics of a machine assembly 100. The system would be applicable to a monitoring system adapted for use with any machine. The exemplary machine assembly 100 introduced in FIG. 1 is representative of any machine. In the exemplary embodiment the machine assembly 100 includes a rotating machine 110 driving a shaft 120, 124. The shaft is arranged having a first shaft portion 120 extending axially from the rotating machine 110 in a first direction and a second shaft portion 124 extending axially from the rotating machine 110 in a second, opposite direction. It is understood that the machine assembly 100 can include any rotating drive system, such as a single shaft portion, a pair of shaft portions 120, 124 (as shown), connectivity to a transmission or other gear arrangement (not shown), and the like. In use, the rotating drive system, such as one or both of the first shaft portion 120 and the second shaft portion 124 would be connected to a second rotating apparatus through a connection to a respective first shaft portion coupling end 122 and/or second shaft portion coupling end 126.

The machine assembly 100 commonly includes a rotating machine base 112 assembled to the rotating machine 110. Mounting feet 114 extend outward from a mounting side of the rotating machine base 112. The mounting feet 114 are secured to a supporting surface using a plurality of threaded mounting fasteners 116. The mounting feet 114 may be of a rigid material or of a resilient material, wherein the resilient mounting feet 114 provide dampening. Alignment of the machine assembly 100 can be provided by use of one or more alignment shims 118. It is understood that other alignment mechanisms, such as adjustable supports, etc. may be used for alignment of the machine assembly 100.

The machine assembly 100 may include a monitoring device mounting stud 130, wherein the monitoring device mounting stud 130 provides a mounting feature for temporarily or permanently attaching the hand held condition monitoring device (HHCMD) 200 to the machine assembly 100.

The hand held condition monitoring device (HHCMD) 200 can be provided in any suitable configuration. In one configuration, the control unit 202 and sensor 204 are integrated into a single assembly, more specifically within a single housing. In use, the hand held condition monitoring device (HHCMD) 200 of the first configuration would be secured to the monitoring device mounting stud 130 of the machine assembly 100 as shown. In a second configuration, the control unit 202 and sensor 204 are independently moveable respective to one another. The control unit 202 and sensor 204 are in signal communication with one another using either wired or wireless communications. In use, the hand held condition monitoring device (HHCMD) sensor 204 of the second configuration would be secured to the monitoring device mounting stud 130 of the machine assembly 100. Other examples of condition monitoring devices (HHCMD) 200 include a vibration pen, a microlog, a thermography camera and the like. It is noted, the condition monitoring devices (HHCMD) 200 may or may not require mounting to the machine assembly 100. The monitoring device mounting stud 130 of the machine assembly 100 is only one example of a condition monitoring device mounting configuration. When mounted, the condition monitoring device (HHCMD) 200 might be mounted using one of a stud, a threaded stud (such as the exemplary monitoring device mounting stud 130), a quick connect mounting stud, a stinger (a support tube), or a magnetic mount.

The hand held condition monitoring device (HHCMD) 200 includes a wireless communication circuit 207, enabling wireless communication between the hand held condition monitoring device (HHCMD) control unit 202 and at least one remote condition monitoring status receiving device 220, 240. The at least one remote condition monitoring status receiving device 220, 240 is employed to inform an operator of an execution of an activity by the hand held condition monitoring device (HHCMD) control unit 202 of the hand held condition monitoring device (HHCMD) 200. Each remote condition monitoring status receiving device 220, 240 includes operation support components to provide functionality as needed. The operational support components can include a housing, a microprocessor and/or a microcontroller, a digital memory device, a portable power source, signal connectivity elements (such as wiring, a printed circuit board, and the like), and the like.

The wireless communication between the hand held condition monitoring device (HHCMD) control unit 202 and the first remote condition monitoring status receiving device 220 is represented as a hand held condition monitoring device (HHCMD) to first remote condition monitoring status receiving device communication link 262. The wireless communication between the hand held condition monitoring device (HHCMD) control unit 202 and the first remote condition monitoring status receiving device 240 is represented as a hand held condition monitoring device (HHCMD) to second remote condition monitoring status receiving device communication link 264. The wireless communication can be of any suitable protocol, including radio frequency (RF), Ultra high frequency (UHF), Very high frequency (VHF), Bluetooth, Wi-Fi, Passive-Transmissive (such as Radio Frequency Identification (RFID)), Zigbee, cellular transmission, and the like. In a minimal configuration, the hand held condition monitoring device (HHCMD) 200 would include a signal transmitting circuit 207 and each of the remote condition monitoring status receiving devices 220, 240 would include a signal receiving circuit 247. In an enhanced configuration, the hand held condition monitoring device (HHCMD) 200 would include a signal transceiving circuit 207 and each of the remote condition monitoring status receiving devices 220, 240 would also include a signal transceiving circuit 247.

Each of the data receiving devices 200, 220, 240 can include an operator alert device. The present invention employs a haptic feedback device 212, 232, 252 to provide a haptic feedback to the operator. This enables the operator to wear the remote condition monitoring status receiving device 220, 240. The remote condition monitoring status receiving device 220, 240 can be adapted to any of a variety of configurations for use. The remote condition monitoring status receiving device 220, 240 can be worn by the operator at any reasonable location. In a first example, the first remote condition monitoring status receiving device 220 can be placed within a first remote condition monitoring status receiving device carrying case 228 (wherein the first remote condition monitoring status receiving device carrying case 228 includes one or more belt loops) to be worn about an operator's waist using a first remote condition monitoring status receiving device mounting apparatus 229. Alternatively, the first remote condition monitoring status receiving device 220 can directly include one or more belt loops for attachment to the first remote condition monitoring status receiving device mounting apparatus 229. In a second example, the first remote condition monitoring status receiving device 240 can be placed within a second remote condition monitoring status receiving device carrying case 248 (wherein the second remote condition monitoring status receiving device carrying case 248 includes one or more loops for receiving a wristband) to be worn about an operator's wrist using a first remote condition monitoring status receiving device mounting apparatus 249. Alternatively, the first remote condition monitoring status receiving device mounting apparatus 249 can be directly attached to the first remote condition monitoring status receiving device 220. In another placement, the remote condition monitoring status receiving device 240 can be adapted to be worn about an operator's upper arm (bicep region). In yet another placement, the remote condition monitoring status receiving device 220, 240 can be adapted to be worn about an operator's neck, such as a necklace. In a less preferred placement, the remote condition monitoring status receiving device 240 can be adapted to be worn about an operator's ankle. It is also understood that the remote condition monitoring status receiving device 220, 240 can be inserted into a pocket of a garment worn by the operator. The remote condition monitoring status receiving device 220, 240 can be utilized with protective gear worn by the operator. Examples of protective gear include: a hard hat or helmet, glasses, gloves, elbow pads, knee pads, ear protectors, and the like. The remote condition monitoring data receiving device 220, 240 can be integrated within the protective gear, temporarily attached to the protective gear by a coupling system, placed within a pocket integral with the protective gear, and the like.

Each of the data receiving devices 200, 220, 240 can include a data display 206, 226, 246. The data display 206, 226, 246 presents additional details of the machine parameters to the operator. This can include actual parameter measurements, machine condition trends, and the like. The ability to review the actual quantitative data enables the operator to make informed decisions pertaining to service of the machine.

In addition to having a haptic feedback device 212, 232, 252, each of the data receiving devices 200, 220, 240 can include a secondary operator alert device, such as a visual alert device 214, 234, 254; an audible alert device 216, 236, 256, or any other suitable alert device. Collectively, the haptic feedback device 212, 232, 252; the visual alert device 214, 234, 254; and the audible alert device 216, 236, 256 can be referred to as a user alert devices group 210, 230, 250.

Figure 2:
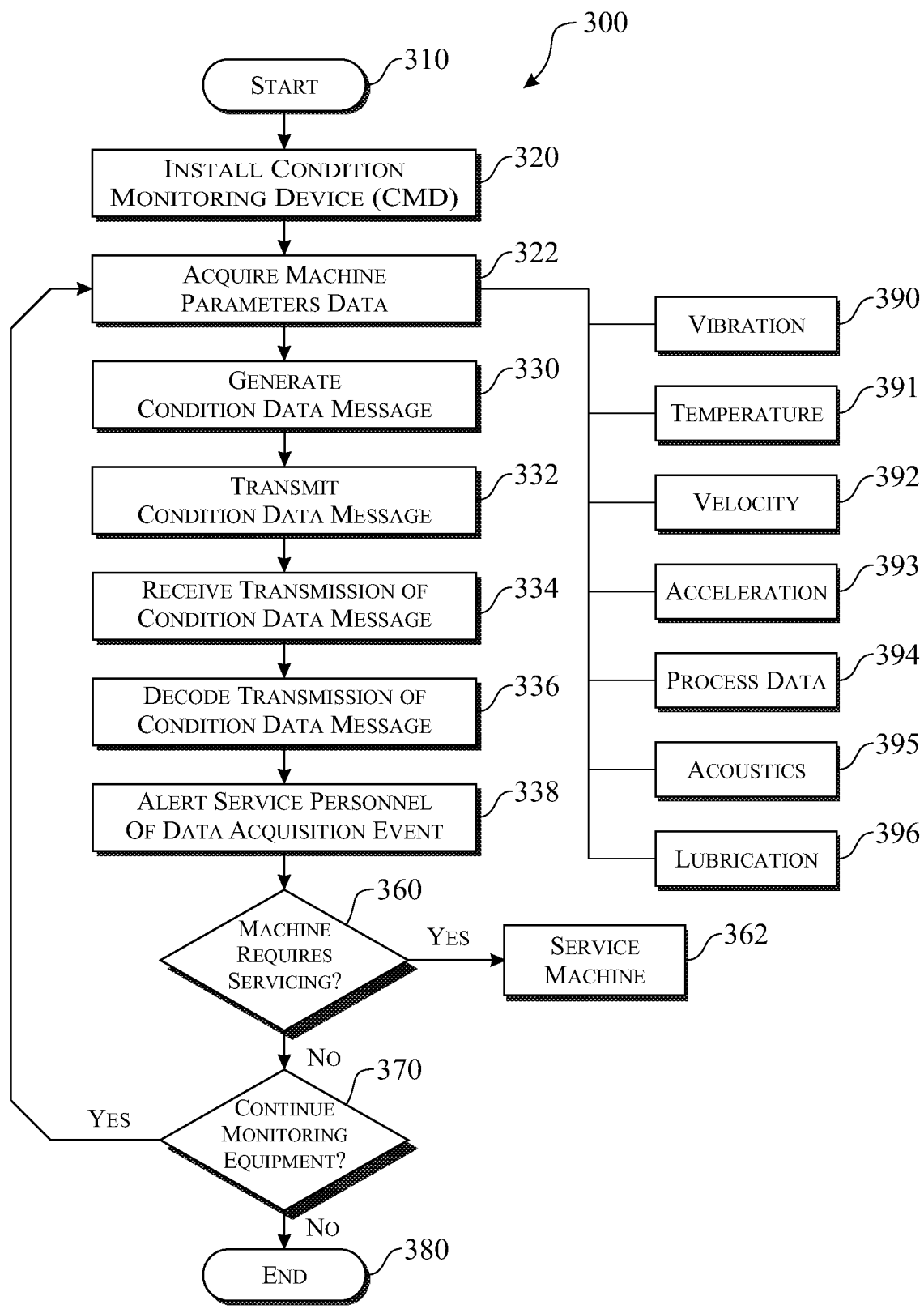
FIG. 2 presents a flow diagram describing an exemplary machine condition monitoring process providing an operator alert employing haptic feedback.

Operation of the condition monitoring system is described in an exemplary remote alert monitoring process 300 presented in FIG. 2. The operation begins with a monitoring process initiation step (step 310). The operator installs the hand held condition monitoring device (HHCMD) 200 or the hand held condition monitoring device (HHCMD) sensor 204 in communication with the hand held condition monitoring device (HHCMD) control unit 202 onto the machine assembly 100 (step 320). The hand held condition monitoring device (HHCMD) 200 initiates a process of acquiring machine parameters (step 322) from the operating machine assembly 100. The parameters acquisition step (step 322) can include acquisition of any measurement of a parameter, such as a vibration 390, a temperature 391, a velocity 391, an acceleration 393, process data 394, acoustics 395, lubrication 396, and any other parameters. Collectively, the machine parameters define a machine condition.

In a broad application, the hand held condition monitoring device (HHCMD) control unit 202 generates a machine condition status message (step 330). The machine condition status message is transmitted using a communication circuit (step 332). The transmitted machine condition status message is received by any remote condition monitoring status receiving device 220, 240 (step 334). The remote condition monitoring status receiving device 220, 240 decodes the received machine condition status message (step 336). The remote condition monitoring status receiving device 220, 240 alerts the operator of a data acquisition event (step 338). The remote condition monitoring status receiving device 220, 240 activates the associated user alert devices 210, user alert devices 230, user alert devices 250, more specifically, the remote condition monitoring status receiving device 220, 240 activates the respective haptic feedback device 212, 232, 252; then any other alerting device, such as the visual alert device 214, 234, 254 and/or the audible alert device 216, 236, 256. The haptic feedback device 212, 232, 252 can be worn under clothing, concealing the device. The haptic feedback alerts the operator without requiring the operator to continuously view the device. The haptic feedback overcomes any limitations of environmental noise generated by machines operating in the area.

The common haptic feedback is a short, continuous tactile feedback. The haptic feedback can include a specific feedback a single 'tap' or series of 'taps' to signal one or more specific conditions. The sequence of 'taps' can be associated with one or more specific condition.

It is understood that the notification process can be adapted for any of a variety of scenarios, including:
 a) When the measurement is finished, as described above,
 b) When the measurement needs to be re-taken,
 c) When the measurement is evaluated to show an alarm condition, introduced below, and
 d) When the overall asset measurements collectively show an alarm condition (this computation as a result of e.g. a built-in asset diagnostic model), as introduced below.

In a configuration where the haptic feedback mechanism is built-in to the same housing carrying the sensing element, the instruction set will include intelligence to activate the haptic feedback mechanism only when it is certain the measurement will not be influenced by it.

The utilization of the haptic feedback device 212, 232, 252 provides a significant advantage over the other alerting devices. For example, the visual alert device 214, 234, 254 requires that the operator maintain the visual alert device 214, 234, 254 in view to optimize a response time. Any time where the visual alert device 214, 234, 254 is no longer in view could reduce a reaction time for reacting to a machine condition event. The audible alert 216, 236, 256 introduces a different set of limitations. The audible alert 216, 236, 256 must be of a sufficient decibel level to be heard over any localized noise, including operating noise generated by one or more operation machine assemblies 100. The noise level of the audible alert 216, 236, 256 would have to be increased if the remote condition monitoring status receiving device 220, 240 were worn under an operator's attire, as the operator's attire would muffle the emitted sound. The haptic feedback device 212, 232, 252 provides a haptic feedback to an operator.

The operator would review the parameter measurements or machine condition data to determine if the machine requires servicing (decision step 360). In a condition where the operator determines that the machine requires servicing (step 362), the operator services the machine. Upon completion of the serving step, the operator would normally restart operation of the machine. The process would reinitiate the step of acquiring parameter data measurements (step 332). In an optional decision step, the operator can determine if the machine's condition should continue to be monitored (decision step 370). In a condition where it is determined to continue monitoring the machine's condition, the process returns to the step of acquiring machine condition data (step 332). In a condition where it is determined to cease monitoring the machine's condition, the process proceeds to a step of monitoring process termination (step 380). The step to cease monitoring the machine's condition (step 380) can be based upon a desire to remove the hand held condition monitoring device (HHCMD) 200 from the machine assembly 100, termination of operation of the machine, and the like. The step to cease monitoring the machine's condition (step 380) can be dependent or independent of the state of operation of the machine.

Figure 3:
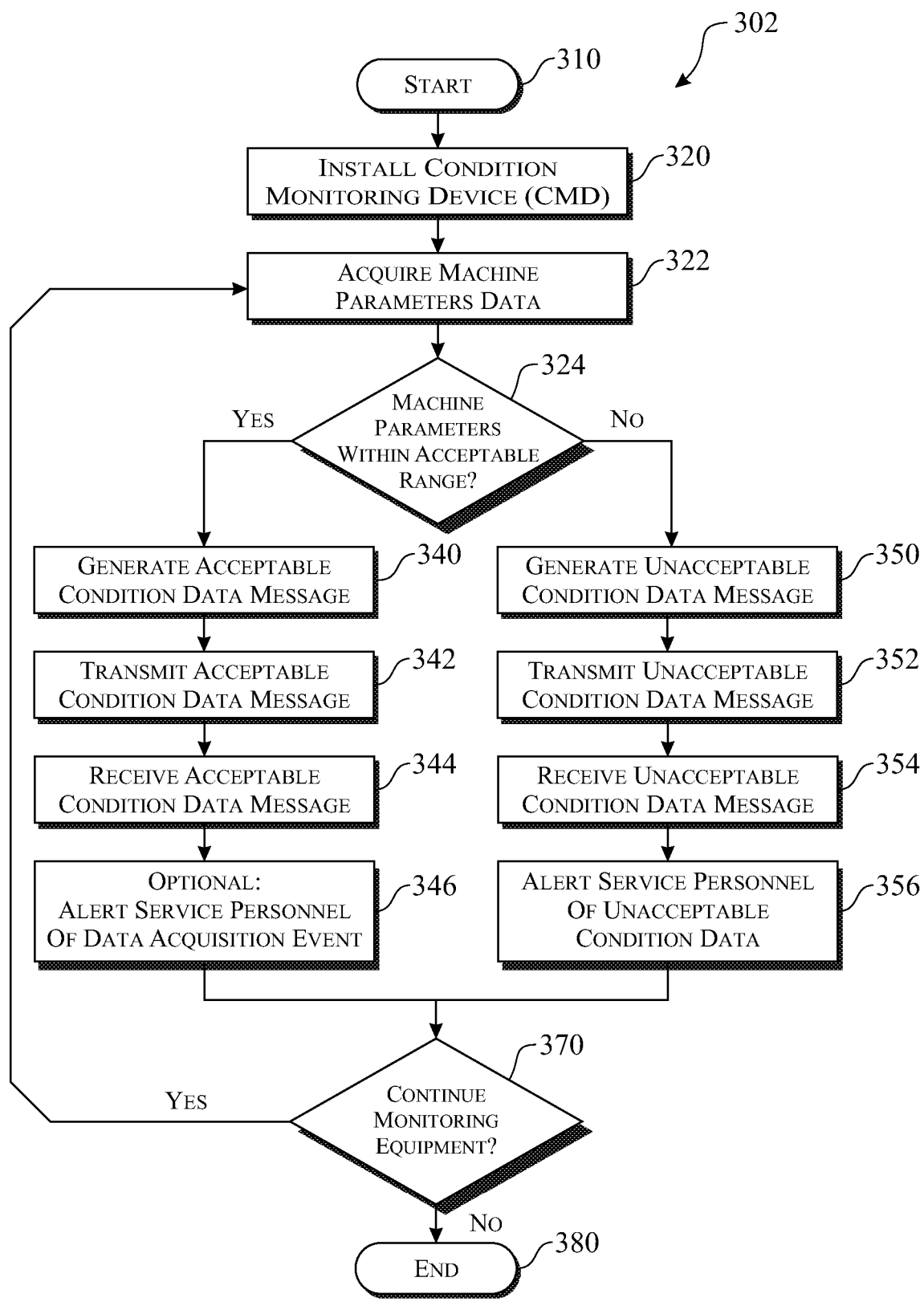
FIG. 3 presents a flow diagram describing an exemplary enhanced machine condition monitoring process providing an operator alert employing haptic feedback.

The remote alert monitoring process 300 can be enhanced, as described in an exemplary enhanced remote alert monitoring process 302 presented in FIG. 3. The enhanced remote alert monitoring process 302 introduces steps related to determining whether the acquired machine parameter measurements are within an acceptable range (decision step 324).

In a condition where the acquired machine parameter measurements are within an acceptable range, the hand held condition monitoring device (HHCMD) control unit 202 generates an acceptable machine condition data message (step 340). The process continues with a step of transmitting the acceptable machine condition data message (step 342). This can be accomplished using a communication circuit integral with the hand held condition monitoring device (HHCMD) 200. One or more devices would receive the transmitted acceptable machine condition data message (step 344). This can be any remote condition monitoring status receiving device 220, 240; a remote condition monitoring status receiving terminal 520, 530, 540 (FIG. 5); an intermediary transceiving device, such as a machine condition data server, a data router, a data switch, a machine condition data website, and the like. The message is subsequently decoded and acted upon accordingly. In one optional step, the receiving device can alert the operator of a completion of a machine condition data acquisition event (step 346). The alert is accomplished by activating the respective haptic feedback device 212, 232, 252. The alert process can additionally active other alerting devices, such as the visual alert devices 214, 234, 254 and the audible alert devices 216, 236, 256 as desired. Alternatively, based upon an acceptable machine operating condition, the receiving device can remain tacit regarding emission of any alert to the operator.

In addition to haptic feedback related to a measurement cycle as described above, the haptic mechanism can be engaged by control room operators (such as those monitoring the terminals 520, 530, 540) to indicate a need for specific action from personnel in the field and/or transmission of one or more plant wide messages (alerts, alarms etc.). The control room operator can initiate a signal to activate any haptic device on any of the remote condition monitoring status receiving devices 220, 240 to alert field based personnel of a need for execution of a specific action or series of actions. The described messaging system has an advantage wherein field personnel need not be visually or audibly observing a message panel.

In a condition where at least one of the acquired machine parameter measurements are outside of the acceptable range, the hand held condition monitoring device (HHCMD) control unit 202 generates an unacceptable machine condition data message (step 350). The process continues with a step of transmitting the unacceptable machine condition data message (step 352). This can be accomplished using a communication circuit integral with the hand held condition monitoring device (HHCMD) 200. One or more devices would receive the transmitted unacceptable machine condition data message (step 354). This can be any remote condition monitoring status receiving device 220, 240; a remote condition monitoring status receiving terminal 520, 530, 540; an intermediary transceiving device, such as a machine condition data server, a data router, a data switch, a machine condition data website, and the like. The message is subsequently decoded and acted upon accordingly. The receiving device would alert the operator that at least one unacceptable machine parameter measurement was acquired (step 356). The alert is accomplished by activating the respective haptic feedback device 212, 232, 252. The alert process can additionally active other alerting devices, such as the visual alert devices 214, 234, 254 and the audible alert devices 216, 236, 256 as desired. The alerted operator would initiate appropriate steps to service the machine and resolve any machine parameter that is outside of an acceptable level.

The exemplary hand held condition monitoring device (HHCMD) 200 presents a hand held solution. It is understood that the hand held condition monitoring device (HHCMD) 200 can be adapted to be permanently secured to the machine assembly 100, such as the exemplary fixed condition monitoring device (CMD) 400 presented in the illustration of FIG. 4. The fixed condition monitoring device (CMD) 400 would include a mounting configuration (not shown, but well understood by those skilled in the art) for securing the fixed condition monitoring device (CMD) 400 to the machine assembly 100. The fixed condition monitoring device (CMD) 400 can include the same features as the hand held condition monitoring device (HHCMD) 200. Like features of the fixed condition monitoring device (CMD) 400 and the hand held condition monitoring device (HHCMD) 200 are number the same, except preceded by a numeral "4". The fixed condition monitoring device (CMD) 400 is permanently attached to the machine assembly 100. The fixed condition monitoring device (CMD) 400 would be affixed to the machine assembly 100 using any suitable attachment elements known by those skilled in the art. The fixed condition monitoring device (CMD) 400 would operate in accordance with the operation of the hand held condition monitoring device (HHCMD) 200 previously described. In one configuration of the fixed condition monitoring device (CMD) 400, the hand held condition monitoring device (HHCMD) control unit 402 can be detachable or separate from the hand held condition monitoring device (HHCMD) sensor 404. In this configuration, there are advantages to including any of a variety of user alert devices 410 with the fixed condition monitoring device (CMD) 400. The illustration presents an exemplary group of optional user alert devices 410, wherein the exemplary group of optional user alert devices 410 includes a haptic feedback device 412, a visual alerting device 414, and an audible alerting device 416. Machine parameter measurements acquired by the fixed condition monitoring device (CMD) 400 can be viewed by an operator on a hand held condition monitoring device (HHCMD) display 406 of the fixed condition monitoring device (CMD) 400, a first remote condition monitoring status receiving device information display 226 of the first remote condition monitoring status receiving device 220, a first remote condition monitoring status receiving device information display 246 of the first remote condition monitoring status receiving device 240, or using a display associated with any other computing device.

The hand held condition monitoring device (HHCMD) 200 can provide acquired machine parameter measurements to one or more remotely located computers 520, 530, 540, as shown in the exemplary illustration presented in FIG. 5. The hand held condition monitoring device (HHCMD) 200 would convey the acquired machine parameter measurements to at least one remotely located computer 520, 530, 540 using a wired or preferably wireless communication link. The remotely located computer 520, 530, 540 can be desktop computers, laptop computers, portable computing tablets, Smartphones, Smart data watches, and the like. The network can be within one structure or supported through an Internet, a cloud, or any other networking structure. It is understood that the network is preferably a secured network. In the exemplary embodiment, the hand held condition monitoring device (HHCMD) 200 and the first remote condition monitoring status receiving terminal 520 communicate through a condition monitoring device (CMD) to first remote condition monitoring status receiving terminal communication link 562. Similarly, the hand held condition monitoring device (HHCMD) 200 and the second remote condition monitoring status receiving terminal 530 communicate through a condition monitoring device (CMD) to second remote condition monitoring status receiving terminal communication link 563 and the hand held condition monitoring device (HHCMD) 200 and the nth remote condition monitoring status receiving terminal 540 communicate through a condition monitoring device (CMD) to nth remote condition monitoring status receiving terminal communication link 564. The first remote condition monitoring status receiving terminal 520, the second remote condition monitoring status receiving terminal 530, and the nth remote condition monitoring status receiving terminal 540 may communicate with one another through one or more remote condition monitoring status receiving terminal to remote condition monitoring status receiving terminal communication links 565. Each communication link can be accomplished using any known wired or wireless communication process, including Ethernet, Internet, Wi-Fi, Bluetooth, cellular communications, radio communications, and the like.

Figure 6:
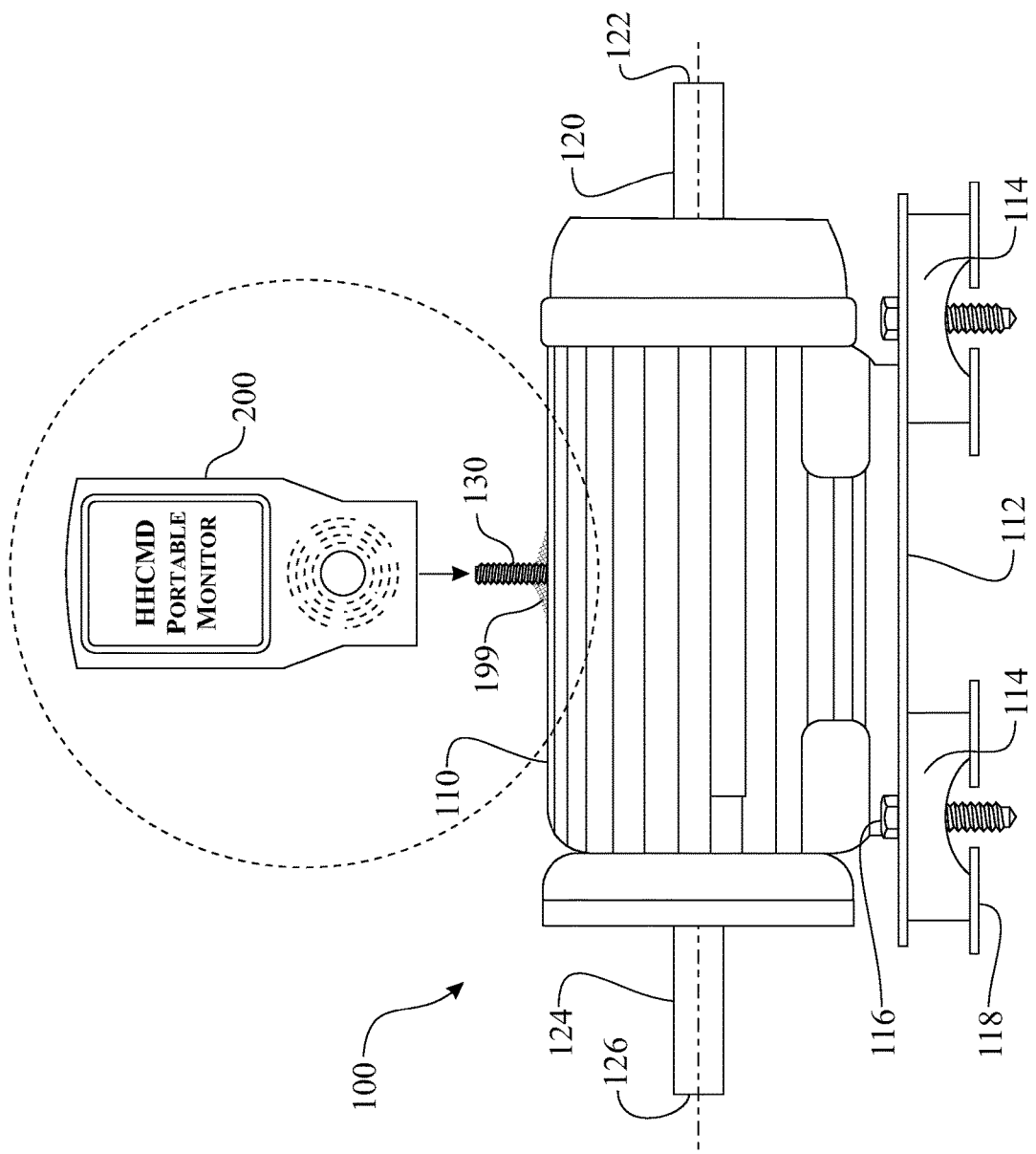
FIG. 6 presents an elevation view illustrating an exemplary installation process employing haptic feedback for dislodging contaminants residing between the hand held condition monitoring device (HHCMD) and a mounting feature of the machine.
Figure 7:
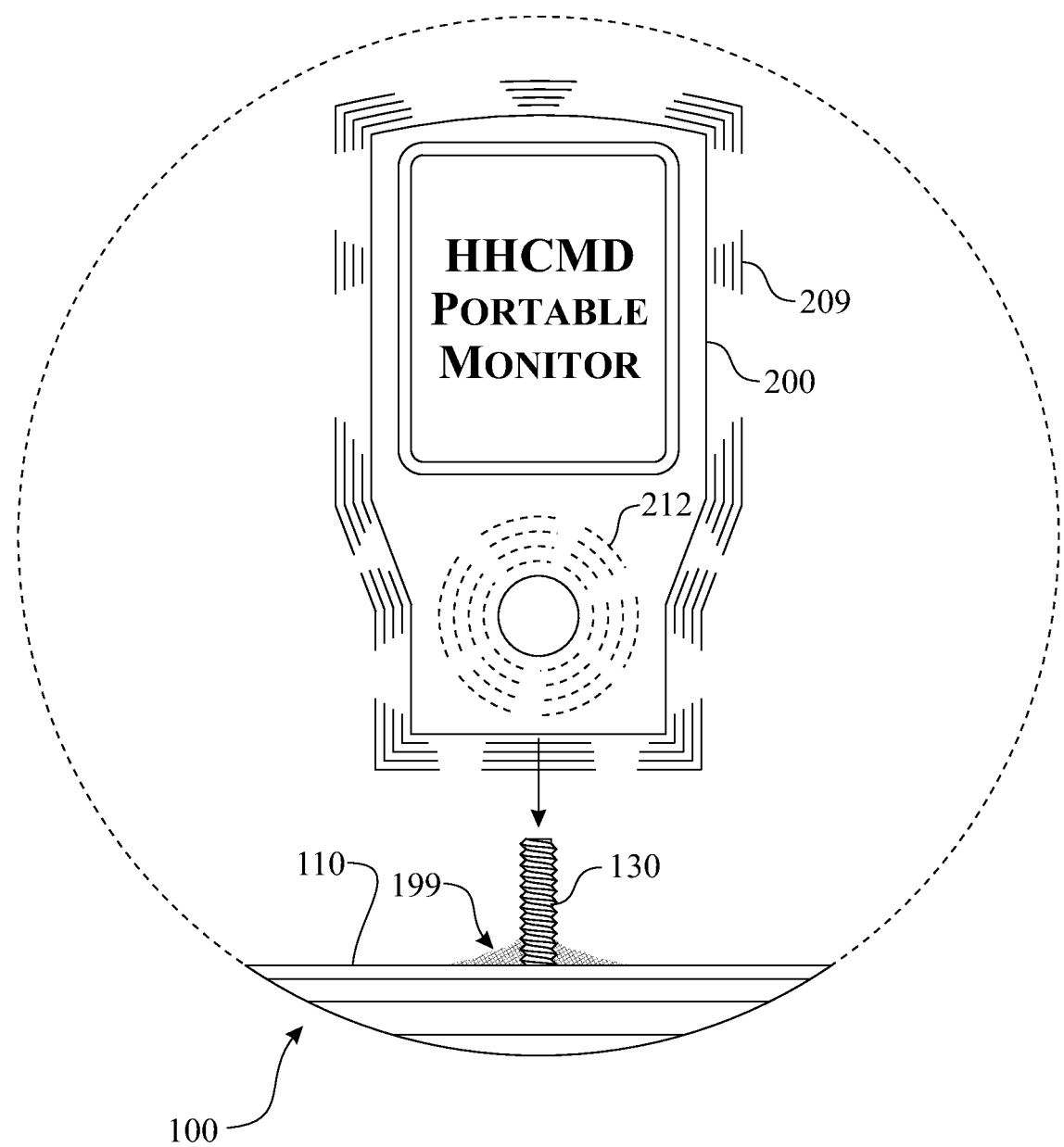
FIG. 7 presents an enlarged view of the illustration presented in FIG. 6.
Figure 8:
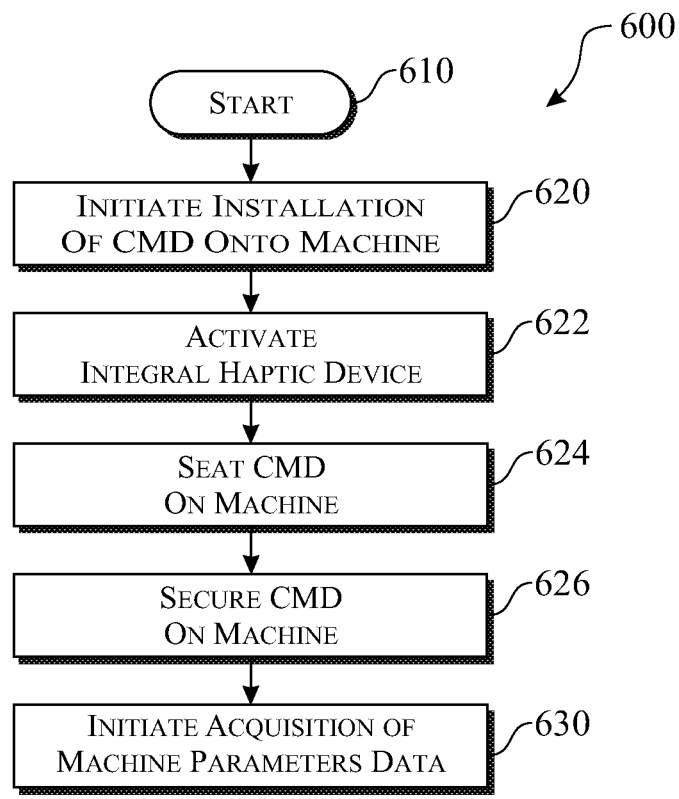
FIG. 8 presents a flow diagram describing an exemplary installation process employing haptic feedback for dislodging contaminants residing between the hand held condition monitoring device (HHCMD) and a mounting feature of the machine.

The integration of the haptic feedback device 212 with the hand held condition monitoring device (HHCMD) 200 can provide other additional benefits. One significant benefit is a use of the haptic feedback during the process of installing the hand held condition monitoring device (HHCMD) 200 onto the machine assembly 100 (step 320), as illustrated in FIGS. 6 through 8. The quality of the contact between the hand held condition monitoring device (HHCMD) 200 and the machine assembly 100 directly relates to the accuracy of the measurements of the parameters defining the machine's condition. The contaminants 199 can act as an insulator when measuring temperature. The contaminants 199 can act as a dampener when measuring acceleration, vibration, or any other motion. The haptic feedback can be activated during the process of installing the hand held condition monitoring device (HHCMD) 200 onto the machine assembly 100 to remove any contaminants 199 from a region around the monitoring device mounting stud 130. The haptic feedback generates a hand held condition monitoring device (HHCMD) vibration 209. The hand held condition monitoring device (HHCMD) vibration 209 dislodges the contaminants 199 from the region surrounding the monitoring device mounting stud 130, resulting in a debris free contact between a mounting surface of the hand held condition monitoring device (HHCMD) 200 and the respective mounting surface of the machine assembly 100, such as the monitoring device mounting stud 130.

The enhanced process of installing the hand held condition monitoring device (HHCMD) 200 onto the machine assembly 100 is described in an exemplary haptic assisting condition monitoring device (CMD) installation process 600 presented in FIG. 8. The installation process begins with an installation process preparation step (step 610). This includes a step of obtaining all of the necessary equipment for monitoring at least one condition of a machine 100, such as the hand held condition monitoring device (HHCMD) 200. The operator would approach the machine assembly 100 with the necessary equipment. The operator would initiate installation of the hand held condition monitoring device (HHCMD) 200 into the machine assembly 100 (step 620). This can include a process of aligning the hand held condition monitoring device (HHCMD) 200 with the monitoring device mounting stud 130. The operator would activate the haptic device 212 (step 622). The user would continue to install the hand held condition monitoring device (HHCMD) 200 into the machine assembly 100, seating the hand held condition monitoring device (HHCMD) 200 onto the machine assembly 100 (step 624) while the haptic feedback device 212 is generating a haptic feedback 209 as shown in FIG. 7. The hand held condition monitoring device (HHCMD) vibration 209 dislodges any contaminants 199 residing proximate the monitoring device mounting stud 130. Once seated, the hand held condition monitoring device (HHCMD) 200 is secured to the machine assembly 100 (step 626). In one solution, the hand held condition monitoring device (HHCMD) 200 can be secured to the machine assembly 100 by tightening one or more mechanical fasteners. Once the hand held condition monitoring device (HHCMD) 200 is secured to the machine assembly 100, the operator can activate the hand held condition monitoring device (HHCMD) 200 to being acquiring machine parameter measurements (step 630).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REFERENCE ELEMENTS

Ref No. Description
100 machine assembly
110 rotating machine
112 rotating machine base
114 mounting foot
116 threaded mounting fastener
118 alignment shim
120 first shaft portion
122 first shaft portion coupling end
124 second shaft portion
126 second shaft portion coupling end 130 monitoring device mounting stud
199 contaminants
200 hand held condition monitoring device (HHCMD)
202 hand held condition monitoring device (HHCMD) control unit
204 hand held condition monitoring device (HHCMD) sensor
206 hand held condition monitoring device (HHCMD) display
207 hand held condition monitoring device (HHCMD) communication circuit
209 hand held condition monitoring device (HHCMD) vibration
210 user alert devices
212 haptic feedback device
214 visual alerting device
216 audible alerting device
220 first remote condition monitoring status receiving device
226 first remote condition monitoring status receiving device information display
227 first remote condition monitoring status receiving device communication circuit
228 first remote condition monitoring status receiving device carrying case
229 first remote condition monitoring status receiving device mounting apparatus
230 user alert devices
232 haptic feedback device
234 visual alerting device
236 audible alerting device
240 first remote condition monitoring status receiving device
246 first remote condition monitoring status receiving device information display
247 second remote condition monitoring status receiving device communication circuit
248 second remote condition monitoring status receiving device carrying case
249 first remote condition monitoring status receiving device mounting apparatus
250 user alert devices
252 haptic feedback device
254 visual alerting device
256 audible alerting device
262 hand held condition monitoring device (HHCMD) to first remote condition monitoring status receiving device communication link
264 hand held condition monitoring device (HHCMD) to second remote condition monitoring status receiving device communication link
300 remote alert monitoring process
302 enhanced remote alert monitoring process
310 monitoring process initiation step
320 install condition monitoring device (CMD) onto machine step
322 acquire machine parameters data step
324 machine parameters within acceptable range decision step
330 generate machine condition data message step
332 transmit machine condition data message step
334 receive machine condition data message step
336 decode received machine condition data message step
338 alert service personnel of data acquisition event step
340 generate acceptable machine condition data message step
342 transmit acceptable machine condition data message step
344 receive acceptable machine condition data message step
346 optional alert service personal of data acquisition event step
350 generate unacceptable machine condition data message step
352 transmit unacceptable machine condition data message step
354 receive unacceptable machine condition data message step
356 alert service personal of unacceptable condition data acquisition event step
360 machine requiring service decision step
362 service machine step
370 continue monitoring equipment decision step
380 monitoring process termination step
390 vibration data acquisition step
391 temperature data acquisition step
392 velocity data acquisition step
393 acceleration data acquisition step
394 process data acquisition step
395 acoustics data acquisition step
396 lubrication data acquisition step
400 fixed condition monitoring device (CMD)
402 hand held condition monitoring device (HHCMD) control unit
404 hand held condition monitoring device (HHCMD) sensor
406 hand held condition monitoring device (HHCMD) display
407 hand held condition monitoring device (HHCMD) communication circuit
410 user alert devices
412 haptic feedback device
414 visual alerting device
416 audible alerting device
462 fixed condition monitoring device (CMD) to first remote condition monitoring status receiving device communication link
464 fixed condition monitoring device (CMD) to second remote condition monitoring status receiving device communication link
520 first remote condition monitoring status receiving terminal
530 second remote condition monitoring status receiving terminal
540 nth remote condition monitoring status receiving terminal
562 condition monitoring device (CMD) to first remote condition monitoring status receiving terminal communication link
563 condition monitoring device (CMD) to second remote condition monitoring status receiving terminal communication link
564 condition monitoring device (CMD) to nth remote condition monitoring status receiving terminal communication link
565 remote condition monitoring status receiving terminal to remote condition monitoring status receiving terminal communication link
600 haptic assisting condition monitoring device (CMD) installation process
610 installation process initiation step
620 initiate installation of condition monitoring device (CMD) onto machine step
622 activate integral haptic device step

624 seat condition monitoring device (CMD) onto machine step

626 secure condition monitoring device (CMD) on machine step

630 initiate machine parameter measurements acquisition process step

I claim:

1. A machine condition monitoring system, the system comprising:
 a condition monitoring device including a condition monitoring sensor in signal communication with a condition monitoring controller;
 a haptic feedback device in operational communication with the condition monitoring controller;
 wherein the condition monitoring controller includes an instruction set comprising steps of:
  obtaining a machine condition from the condition monitoring sensor,
  determining if the machine condition is one of within an acceptable operating range or in an alarm condition,
  notifying an operator each time a machine parameter measurement has been acquired by activating the haptic feedback device, wherein the activated haptic feedback device generates a sense of touch by applying one of forces, vibrations, or motions to the operator, expediting awareness of each acquisition of the machine parameter measurement, enabling the operator to react accordingly in a timely manner, including:
  (i) in a first condition where the machine condition is within the acceptable operating range, the condition monitoring controller provides an acceptable operating range signal which activates the haptic feedback device, the activated haptic feedback device being indicative that the machine condition has just been obtained and is within the acceptable operating range, and
  (ii) in a second condition where the machine condition is within the alarm condition, the condition monitoring controller provides an alarm condition signal which activates the haptic feedback device and a secondary alert device, the activated haptic feedback device and the activated secondary alert device being indicative that the machine condition has just been obtained and is within the alarm condition.

2. The machine condition monitoring system as recited in claim 1, wherein the condition monitoring sensor is adapted to measure at least one of: vibration, temperature, velocity, acceleration, harmonics, and acoustics.

3. The machine condition monitoring system as recited in claim 1, wherein the haptic feedback device is integrated with the condition monitoring controller, and
 wherein the condition monitoring sensor is independently moveable with respect to the condition monitoring controller.

4. The machine condition monitoring system as recited in claim 1, further comprising:
 a first communication circuit integral with the condition monitoring device;
 at least one remote condition monitoring status receiving device, each remote condition monitoring status receiving device comprising:
 a second communication circuit, wherein the second communication circuit is adapted for signal communication with the first communication circuit; and
 a haptic feedback device.

5. The machine condition monitoring system as recited in claim 4, wherein one of the at least one remote condition monitoring status receiving device is adapted to be worn on a belt, wherein the belt is sized to be worn about a waist of the operator.

6. The machine condition monitoring system as recited in claim 4, wherein one of the at least one remote condition monitoring status receiving device is adapted to be worn on a band, wherein the band is sized to be worn about at least one of a wrist of the operator, an upper arm of the operator, and an ankle of the operator.

7. The machine condition monitoring system as recited in claim 4, further comprising a remote condition monitoring status receiving device carrying case,
 wherein the remote condition monitoring status receiving device carrying case is adapted to be worn by the operator,
 wherein the remote condition monitoring status receiving device is carried by the remote condition monitoring status receiving device carrying case.

8. The machine condition monitoring system as recited in claim 1, wherein the secondary alert device comprises at least one of a light emitting device and an audible emitting device.

9. A machine condition monitoring system, the system comprising:
 a condition monitoring device including:
  a condition monitoring sensor in signal communication with a condition monitoring controller;
  a first communication circuit integral with the condition monitoring device;
 at least one remote condition monitoring status receiving device, each remote condition monitoring status receiving device comprising:
  a second communication circuit, the second communication circuit being adapted for signal communication with the first communication circuit; and
  a haptic feedback device;
 wherein the condition monitoring sensor is adapted to measure at least one of: vibration, temperature, velocity, acceleration, harmonics, and acoustics; and
 wherein the condition monitoring controller includes an instruction set comprising steps of:
  obtaining a machine condition from the condition monitoring sensor,
  determining if the machine condition is one of within an acceptable operating range or in an alarm condition,
  notifying an operator each time a machine parameter measurement has been acquired by activating the haptic feedback device, wherein the activated haptic feedback device generates a sense of touch by applying one of forces, vibrations, or motions to the operator, expediting awareness of each acquisition of the machine parameter measurement, enabling the operator to react accordingly in a timely manner, including:
  (i) in a first condition where the machine condition is within the acceptable operating range, the condition monitoring controller provides an acceptable operating range signal which activates the haptic feedback device, the activated haptic feedback device being indicative that the machine condition has just been obtained and is within the acceptable operating range, and
  (ii) in a second condition where the machine condition is within the alarm condition, the condition monitoring controller provides an alarm condition signal which activates the haptic feedback device and a secondary alert device, the activated haptic feedback device and the activated secondary alert device being indicative that the machine condition has just been obtained and is within the alarm condition.

10. The machine condition monitoring system as recited in claim 9, wherein the secondary alert device comprises at least one of a light emitting device and an audible emitting device.

11. The machine condition monitoring system as recited in claim 9, wherein the haptic feedback device is integrated with the condition monitoring controller, and
wherein the condition monitoring sensor is independently moveable with respect to the condition monitoring controller.

12. The machine condition monitoring system as recited in claim 9, wherein one of the at least one remote condition monitoring status receiving device is adapted to be worn on a belt, wherein the belt is sized to be worn about a waist of the operator.

13. The machine condition monitoring system as recited in claim 9, wherein one of the at least one remote condition monitoring status receiving device is adapted to be worn on a band, wherein the band is sized to be worn about at least one of a wrist of the operator, an upper arm of the operator, and an ankle of the operator.

14. The machine condition monitoring system as recited in claim 9, further comprising a remote condition monitoring status receiving device carrying case,
wherein the remote condition monitoring status receiving device carrying case is adapted to be worn by the operator,
wherein the remote condition monitoring status receiving device is carried by the remote condition monitoring status receiving device carrying case.

15. A method of utilizing a haptic feedback device in conjunction with a machine condition data acquisition process, the method comprising steps of:
acquiring a condition monitoring system, wherein the condition monitoring system includes a haptic feedback device, wherein the haptic feedback device is integral with a condition monitoring device;
dislodging contaminants from a condition monitoring device attachment region on a machine by activating the haptic feedback device during installation of the condition monitoring device,
offering a group of notification scenarios, the group of notification scenarios comprising:
a) determining if the machine condition is one of within an acceptable operating range or in an alarm condition,
wherein, in a condition where the machine condition is within the acceptable operating range, and
wherein, in a condition where the machine condition is within the alarm condition, and
b) when the measurement needs to be re-taken;
selecting at least one notification scenario based upon at least one notification from the group of notification scenarios; and
the haptic feedback device arranged and operating in accordance with at least one of:
(a) wherein the haptic feedback device is integral with a condition monitoring controller, activating haptic feedback device during installation of the condition monitoring system onto the machine, and
(b) wherein the haptic feedback device is integral with an assembly worn by an operator, obtaining a machine condition from the condition monitoring sensor using the condition monitoring controller,
determining if the machine condition is one of within an acceptable operating range or in an alarm condition, and
notifying an operator each time a machine parameter measurement has been acquired by activating the haptic feedback device, wherein the activated haptic feedback device generates a sense of touch by applying one of forces, vibrations, or motions to the operator, expediting awareness of each acquisition of the machine parameter measurement, enabling the operator to react accordingly in a timely manner, including:
(i) in a condition where the machine condition is within the acceptable operating range, the activated haptic feedback device being indicative that the machine condition has just been obtained, and
(ii) in a condition where the machine condition is within the alarm condition, the activated haptic feedback device being indicative that the machine condition has just been obtained.

16. The method of notifying an operator of a machine condition data acquisition process as recited in claim 15, the method further comprising steps of:
acquiring at least one machine parameter measurement, wherein the at least one machine parameter measurement is indicative of the machine condition;
determining if any of the at least one machine parameter measurement is within the acceptable operating range or if the at least one machine parameter measurement is outside of the acceptable operating range for each associated at least one machine parameter measurement; and
activating the haptic feedback device upon each of the following:
(i) in a condition where every at least one machine parameter measurement is within the acceptable operating range, and
(ii) in a condition where one or more of the at least one machine parameter measurement is within the alarm condition.

17. The method of notifying an operator of a machine condition data acquisition process as recited in claim 15, wherein a condition monitoring device is installed to acquire the at least one machine parameter measurement, and the haptic feedback device is integral with a remote condition monitoring status receiving device, the method further comprising steps of:
acquiring at least one machine parameter measurement using the condition monitoring device, wherein the at least one machine parameter measurement is indicative of the machine condition;
determining if any of the at least one machine parameter measurement is within the acceptable operating range or if the at least one machine parameter measurement is outside of the acceptable operating range for each associated at least one machine parameter measurement; and
activating the haptic feedback device upon each of the following:
(i) in a condition where every at least one machine parameter measurement is within the acceptable operating range, and
(ii) in a condition where one or more of the at least one machine parameter measurement is within the alarm condition.

18. The method of notifying an operator of a machine condition data acquisition process as recited in claim 17, the method further comprising a step of:
  locating the remote condition monitoring status receiving device on one of:
    a waist of the operator,
    a wrist of the operator,
    an upper arm of the operator,
    an ankle of the operator,
    a head of the operator,
    a neck of the operator,
    within a pocket of an article of clothing worn by the operator, and
    integral with a piece of safety gear.

19. The method of notifying an operator of a machine condition data acquisition process as recited in claim 15, wherein a condition monitoring device comprises a control unit and a sensor, the sensor is installed onto a machine to acquire the at least one machine parameter measurement, and the control unit and the haptic feedback device are integral into a hand held device, the method further comprising steps of:
  acquiring at least one machine parameter measurement using the condition monitoring device, wherein the at least one machine parameter measurement is indicative of the machine condition; and
  determining if any of the at least one machine parameter measurement is within the acceptable operating range or if the at least one machine parameter measurement is outside of the acceptable operating range for each associated at least one machine parameter measurement; and
  activating the haptic feedback device upon each of the following:
    (i) in a condition where every at least one machine parameter measurement is within the acceptable operating range, and
    (ii) in a condition where one or more of the at least one machine parameter measurement is within the alarm condition.

20. The method of notifying an operator of a machine condition data acquisition process as recited in claim 15, wherein a condition monitoring device is installed to acquire the at least one machine parameter measurement, and the haptic feedback device is integral with a remote condition monitoring status receiving device, the method further comprising a step of:
  locating the remote condition monitoring status receiving device on one of:
    a waist of the operator,
    a wrist of the operator,
    an upper arm of the operator,
    an ankle of the operator,
    a neck of the operator, and
    within a pocket of an article of clothing worn by the operator.

* * * * *